(12) United States Patent
Ringel

(10) Patent No.: US 8,071,252 B2
(45) Date of Patent: Dec. 6, 2011

(54) INTERCONNECTOR FOR HIGH-TEMPERATURE FUEL CELLS

(75) Inventor: Helmut Ringel, Niederzier (DE)

(73) Assignee: Forschungszentrum Juelich GmbH, Juelich (DE)

( * ) Notice: Subject to any disclaimer, the term of this patent is extended or adjusted under 35 U.S.C. 154(b) by 875 days.

(21) Appl. No.: 11/883,894

(22) PCT Filed: Jan. 14, 2006

(86) PCT No.: PCT/DE2006/000047
§ 371 (c)(1),
(2), (4) Date: May 14, 2008

(87) PCT Pub. No.: WO2006/081790
PCT Pub. Date: Aug. 10, 2006

(65) Prior Publication Data
US 2009/0117414 A1  May 7, 2009

(30) Foreign Application Priority Data
Feb. 4, 2005  (DE) .................. 10 2005 005 116

(51) Int. Cl.
*H01M 2/20* (2006.01)
*H01M 8/00* (2006.01)

(52) U.S. Cl. ........ 429/467; 429/468; 429/508; 429/519; 429/535

(58) Field of Classification Search .................. 429/452, 429/460, 467, 468–470, 507–510, 517–520
See application file for complete search history.

(56) References Cited

U.S. PATENT DOCUMENTS

| 5,733,682 | A | 3/1998 | Quadakkers et al. |
| 5,942,348 | A | 8/1999 | Jansing et al. |
| 6,268,076 | B1 * | 7/2001 | Diekmann et al. ............ 429/495 |
| 2003/0132270 | A1 * | 7/2003 | Weil et al. .................. 228/122.1 |
| 2003/0194592 | A1 | 10/2003 | Hilliard |
| 2004/0050462 | A1 | 3/2004 | Grubb |

FOREIGN PATENT DOCUMENTS

| CA | 2516472 | 9/2004 |
| DE | 100 50 010 A1 | 4/2002 |

* cited by examiner

*Primary Examiner* — Raymond Alejandro
(74) *Attorney, Agent, or Firm* — Andrew Wilford

(57) ABSTRACT

An interconnector for high-temperature fuel cells is characterized in that the interconnector comprises two components (A, B) made of different materials. Component (A), which is in contact with the electrodes and ensures the electric connection between the fuel cell units, is made of a chromium oxide-forming, high-temperature alloy, and component (B), which connects the fuel cell units mechanically, is made of a corrosion-resistant, non-electroconducting, high-temperature material which does not bleed any chromium.

11 Claims, 1 Drawing Sheet

INTERCONNECTOR FOR HIGH-TEMPERATURE FUEL CELLS

CROSS REFERENCE TO RELATED APPLICATIONS

This application is the US national stage of PCT application PCT/DE2006/000047, filed 14 Jan. 2006, published 10 Aug. 2006 as WO 2006/081790, and claiming the priority of German patent application 102005005116.2 itself filed 4 Feb. 2005, whose entire disclosures are herewith incorporated by reference.

FIELD OF THE INVENTION

The invention relates to an interconnector for high-temperature fuel cells.

BACKGROUND OF THE INVENTION

A fuel cell has a cathode, an electrolyte, and an anode. An oxidizing agent, e.g. air, is supplied to the cathode, and a fuel, e.g. water, is supplied to the anode.

Different types of fuel cells are known, for instance the SOFC fuel cell from publication DE 44 30 958 C1 and the PEM fuel cell from publication DE 195 31 852 C1 [CA 2,240,270].

The SOFC fuel cell is also called a high-temperature fuel cell because its operating temperature can be up to 1000° C. In the presence of the oxidizing agent, oxygen ions form on the cathode of a high-temperature fuel cell. The oxygen ions diffuse through the electrolytes and recombine on the anode side, creating water with the hydrogen that comes from the fuel. As this recombination occurs electrons are released and thus electrical energy is generated.

As a rule, a plurality of fuel cells are generally joined together, electrically and mechanically, by connecting elements, also called interconnectors, for attaining great electrical outputs. Electrically series-switched fuel cells that are stacked upon one another result from interconnectors. This arrangement is called a fuel cell stack. Fuel cell stacks comprise interconnectors and the electrode/electrolyte units.

In addition to the electrical and mechanical properties, interconnectors normally also possess gas-distributing structures. This is realized using bars and grooves (DE 44 10 711 C1) [U.S. Pat. No. 5,733,682]. Gas-distributing structures cause the fuel to be distributed uniformly in the electrode spaces (spaces in which the electrodes are located).

The following problems can disadvantageously occur with fuel cells and fuel cell stacks:

Metallic interconnectors with a high aluminum content form $Al_2O_3$ coatings that disadvantageously act like an electric insulator.

Given cyclical temperature loads, generally thermal stresses occur that are associated with movements of the individual parts relative to one another; these result from the different expansion behaviors or the different expansion coefficients of the materials used during operation.

In this regard, in the prior art there is still not adequate compatibility between the comparatively high expansion coefficients e.g. of the metallic interconnectors and the currently known electrode materials, whose expansion coefficients are comparatively low. On the one hand, thermal stresses can occur between electrodes and interconnectors. These can result in destruction within the fuel cell. However, on the other hand this also applies to glass solders that are frequently used in fuel cells, the glass solders being intended to ensure that the fuel cells are sealed. The interconnectors known from the prior art are made of metal, providing good electrical conductivity. However, one disadvantage of the metal interconnectors is comprised in that they are susceptible to corrosion and the service life of the fuel cell is shortened by this. In particular, the use of ferritic chromium steel (e.g. Crofer 22, a steel alloy having 22% chromium) represents a problem for the cathode of the fuel cell. At high temperatures, this material forms a chromium oxide protective layer that is sufficiently conductive. However, under operating conditions chromium evaporates continuously from this protective layer and deactivates the active centers of the cathodes of the fuel cell, so-called chromium poisoning. This means a continuous drop in the performance of the fuel cell. Known from DE 195 47 699 is a selectively coated interconnector that comprises a chromium oxide-forming alloy. It has a protective layer in the area of the gas guiding surfaces that reduces the effects of corrosion and that is an electrical insulator, e.g. a thin $Al_2O_3$ layer. In addition, the interconnector is coated with a mixed oxide layer on the electrode contact surface, leading to an increase in conductivity and to a reduction in the rate of evaporation. This mixed oxide layer is attained e.g. by applying a thin layer made of a metal or metal oxides that forms a mixed oxide (e.g. Spinell type) when used at high temperatures with Cr and/or $Cr_2O_3$ on the oxide/gas limiting surface. Suggested as suitable metals or their oxides are Fe, Ni, or Co, which modify the physical properties of the $Cr_2O_3$ in the desired manner. However, these layers are only stable under certain conditions and tend to burst or crack. Another disadvantage is that the production method for these thin layers is complex.

OBJECT OF THE INVENTION

The object of the invention is therefore to provide an interconnector for a high-temperature fuel cell that is resistant to oxidation, that possesses good conductivity on the limiting surfaces to the electrodes, and that has a low rate of evaporation for volatile chromium oxide/hydroxide. Moreover, the corrosion caused by the contact between the glass solder and metal should be kept to a minimum. It is furthermore an object of the invention to create a simplified production process for an interconnector having the above-described properties. Problems that are based on thermal stresses, e.g. deficient seal, should be prevented.

SUMMARY OF THE INVENTION

This object is attained using an interconnector for a high-temperature fuel cell characterized by an interconnector that comprises two parts made of different materials, whereby one of the parts that is in contact with the electrodes and that provides the electrical connection for the fuel cells comprises a chromium oxide-forming high-temperature alloy, and the other part that mechanically connects the fuel cells comprises a corrosion-resistant high-temperature material that is not electrically conductive, and that does not evaporate chromium such as e.g. chromium oxide. A material that is suitable for the nonconductive part can be for instance an iron-chromium-aluminum alloy that forms an aluminum oxide protective layer. This protective layer prevents chromium from evaporating. This protective layer is not electrically conductive, however. For this reason the electrically conductive part comprises for instance a ferritic chromium steel that is a chromium oxide former. Since most of the fuel cell stack comprises an aluminum oxide former or other materials without chromium, chromium poisoning is sharply reduced. Moreover, the corrosion previously caused by the contact between the chromium oxide-forming steel and the glass solder joints is prevented, because the glass solder is now only in contact with the material of the nonconductive part, which does not evaporate any chromium oxide.

In order to keep thermal stresses between the different materials to a minimum, it is advantageous to select materials with thermal-expansion coefficients that are similar at the operating temperature of the high-temperature fuel cell. Thus for instance a combination of Crofer 22 for the conductive part with aluchrome for the nonconductive part is an advantageous embodiment, as is steel with the material number 1.4742 and aluchrome.

In one advantageous embodiment of the apparatus, the conductive part comprises a rolled profiled sheet metal. This leads to simplified production of the part, since the otherwise conventional chip-removing methods for producing the gas distributing structures that are used for an interconnector produced from a part are not used.

In another advantageous embodiment of the apparatus, the nonconductive part comprises a thin sheet metal. Such an design leads to simplified production of the part. The nonconductive part that forms the frame for the conductive part can be produced for instance such that the recess required for the conductive part is punched out of a sheet metal.

One advantageous design of the apparatus provides that the parts are connected with a thin sheet metal having a thickness of for instance 0.05 to 0.2 mm in order to prevent thermal stresses between the two parts. For this, a gap of for instance 2 to 10 mm can be prespecified between the parts, which gap is covered with a thin metal sheet and is connected gas-tight by means of welding or high-temperature soldering to the two parts.

The object is furthermore attained using a method for producing the inventive interconnector.

BRIEF DESCRIPTION OF THE DRAWING

In the following the invention is explained inter alia also using the description of an illustrated embodiment and referring to the attached FIGURE.

DETAILED DESCRIPTION

Figure 1:
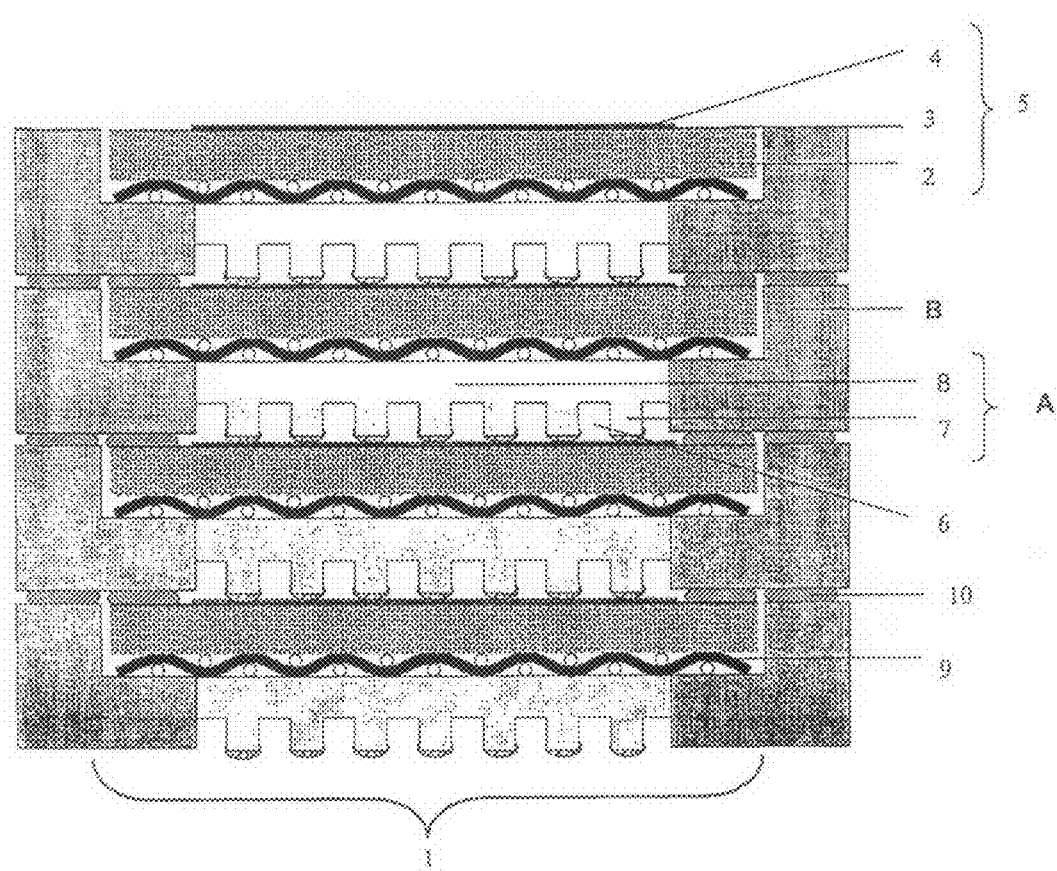

FIG. 1 is a schematic section through a stack of fuel cells that are connected to one another by the inventive interconnectors 1.

FIG. 1 is a schematic illustration of a section through four fuel cells 5, each comprising an anode 2, a cathode 4, and an electrolyte 3 that are connected to one another using the inventive interconnectors 1. The interconnectors 1 are made of two parts A and B that are produced from different materials. The interconnectors contain gas channels 6 and bars 7. The part A includes both the bars 7 and the interconnector wall 8. The part A that provides the electrical conductivity within the fuel cell and each of which is in contact with the cathode 4 and the anode 2 of the subsequent fuel cell is made for instance of a chromium oxide-forming alloy or another current conducting, deformable material. This can be for instance a ferritic chromium steel such as Crofer 22 or noble metals such as silver, platinum, gold, or palladium.

The part B that mechanically connects the individual fuel cells 5 to one another and forms the frame for the part A is made of an electrically insulating material such as for instance ceramic or a ferritic, aluminum oxide-forming alloy. This can be for instance aluchrome that contains 2 to 5% aluminum in addition to the approximately 20% chromium. This aluminum part forms a dense aluminum oxide layer so that chromium is prevented from evaporating. An elastic means can be arranged between anode 2 and interconnector 1 for capturing relative movements. This can be an elastic nickel net 9 for instance. Glass ceramics, for instance, such as e.g. glass solder 10, are used for sealing the joints between fuel cell 5 and interconnectors 1 gas-tight.

The invention claimed is:

1. A fuel-cell stack comprising:
    two fuel cells each comprising anode and cathode electrodes and electrolyte with the anode electrode of one of the cells forming a space with the cathode electrode of the other of the cells;
    a first interconnector part in the space and in contact with one of the electrodes forming the space, the first part forming an electrical connection between the fuel cells and being formed of a chromium oxide-forming high-temperature alloy;
    an elastic element in the space and between the first connector part and the other of the electrodes forming the space; and
    a second interconnector part engaged around and mechanically holding the fuel cells together, the second part being formed of an electrically nonconductive corrosion-resistant high-temperature material that does not evaporate chromium.

2. The fuel-cell stack in accordance with claim 1, wherein the first part comprises a ferritic chromium steel and the second part comprises an iron-chromium-aluminum alloy.

3. The fuel-cell stack in accordance with claim 1, wherein the first part comprises Crofer 22 and the second part comprises aluchrome.

4. The fuel-cell stack in accordance with claim 1, wherein the first part is a rolled profiled sheet metal.

5. The fuel-cell stack in accordance with claim 1, wherein the second part is comprised of thin sheet metal.

6. The fuel-cell stack in accordance with claim 1, wherein the first and second parts are connected to one another with a thin metal sheet.

7. The fuel-cell stack defined in claim 1 wherein the second part laterally surrounds the cells.

8. The fuel-cell stack defined in claim 1 wherein the elastic element is a nickel net.

9. A method for producing an interconnector for high-temperature fuel cells wherein the interconnector is produced from first and second parts, the first part that is in contact with the electrodes and that provides the electrical connection for the fuel cells being made of a rolled profiled sheet metal of a chromium oxide-forming high-temperature alloy, the second part that mechanically connects the fuel cells being made of a corrosion-resistant high-temperature material that is not electrically conductive and that does not evaporate to chromium.

10. The method in accordance with claim 9 wherein the second part is made from a thin sheet metal.

11. A method of making an interconnector for use between two high-temperature fuel cells each having a cathode electrode and an anode electrode, the method comprising the step of:
    spacedly juxtaposing the fuel cells such that one of electrodes of one of the cells spacedly confronts one of the electrodes of the other of the cells;
    producing the interconnector from
        a first nonconductive part of a chromium-oxide-forming high-temperature alloy,
        a second conductive part of a corrosion-resistant high-temperature material that is not electrically conductive and that does not evaporate chromium, and
        an elastic element;
    installing the first conductive part in contact with the one electrode of the one cell and the elastic element between the first part and the one electrode of the other cell; and
    installing the other conductive part around the cells and around the first part.

* * * * *